Patented Aug. 31, 1926.

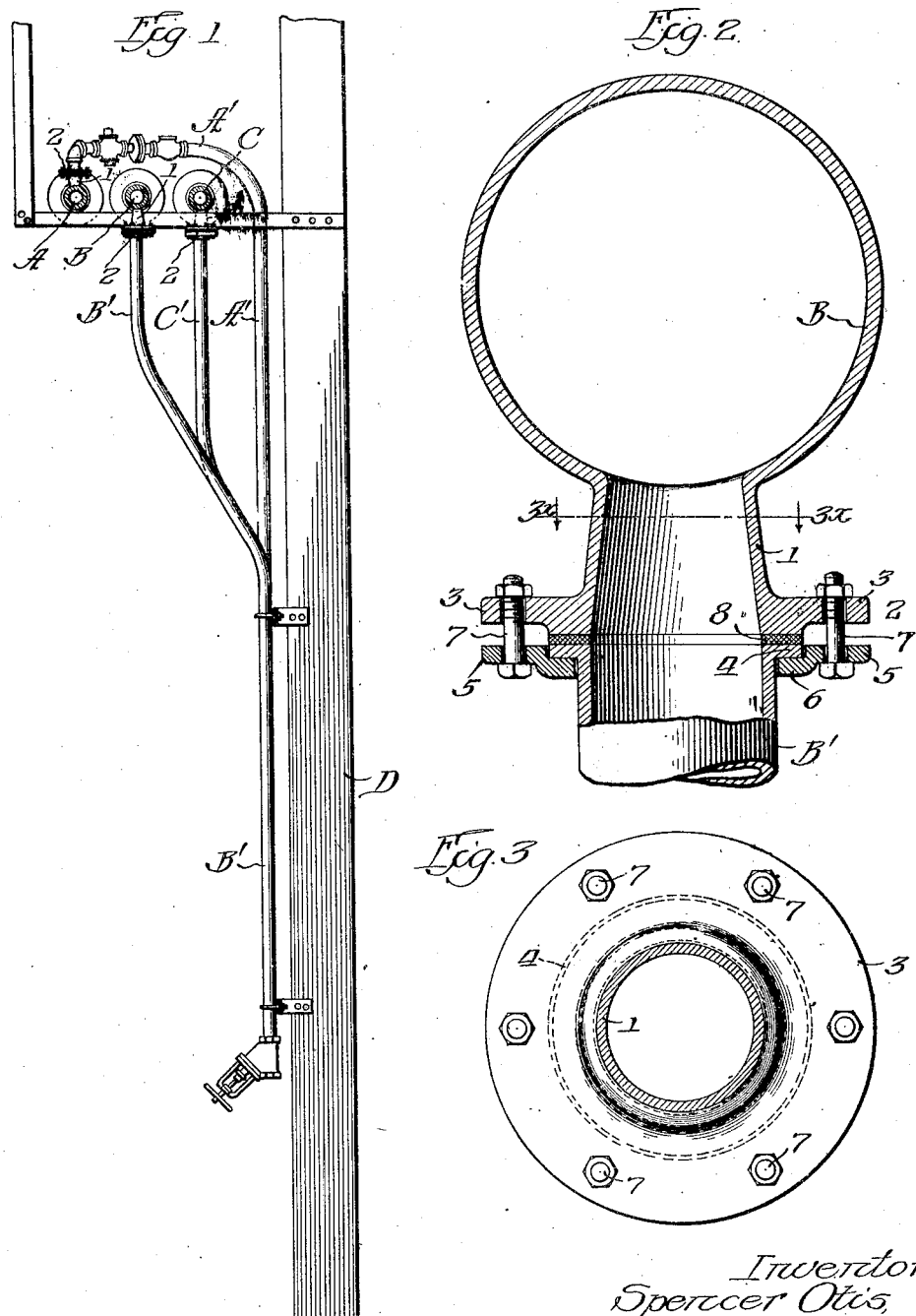

1,598,388

UNITED STATES PATENT OFFICE.

SPENCER OTIS, OF BARRINGTON, ILLINOIS.

DROP PIPE FOR BOILER-WASHING APPARATUS.

Application filed May 9, 1923. Serial No. 637,715.

This invention relates to piping for locomotive terminal houses, and particularly the connections between the drop pipes at a locomotive stall and the main pipes that pass the stall overhead.

In the piping of roundhouses for conducting away products blown off from the boiler of a locomotive occupying a stall in the house, and for supplying washout and refill water to such boiler, it is desirable to cut and fit the pipe before reaching the place of installation, and to shape the pipe and its fittings so that while the mains occupy the predetermined overhead positions in the same horizontal plane, drop pipes will extend transversely therefrom in variously deflected paths that bring all of the drop pipes in the same vertical plane to one side of the main pipes and parallel to the stall tracks, so that they can be secured to a common post and avoid obstructing the working space around the stall. But considerable difficulty and expense, particularly for time, have been experienced in obtaining proper assembly of the drops.

The present invention avoids these objections by equipping the main pipes with transversely presented flanged branches which may extend either upward or downward from the main pipes, developing the drop pipes with the necessary bends to deflect them from the respective main pipes over to the post at the side of the stall, and then uniting the drop pipes with the branches by special flange couplings that leave the drop pipes free to rotate to any angle after assembly of the joint but previous to tightening it up; the joint comprising a clamping ring that is bolted to a flange on the main pipe branch and which embraces a flange on the drop pipe with freedom of rotation thereon, and so draws the end of the drop pipe into liquid-tight abutment against the end of the main pipe branch.

In the accompanying drawing—

Figure 1 is an elevational view of a drop in a plane transverse to the overhead main pipes, which latter are shown in section.

Figure 2 is a sectional detail view on an enlarged scale of the main pipe, its branch and the joint between the branch and a drop pipe; and Figure 3 is a section on the line 3×—3× of Figure 2.

A, B, and C represent overhead main pipes of a boiler washing system, and A′, B′, and C′ drop pipes extending therefrom to a post D, and down said post to within service reach of a locomotive stall. In order to connect the drop pipes with the main pipes, each main pipe carries a branch 1, preferably made integral therewith as by welding, and a joint 2 between said branch and the appropriate drop pipe, the construction of which said joint is as follows:

Branch 1 is formed with a bolting flange 3 surrounding its end, and drop pipe B′, for instance, has a flange 4 around the end through which it seats against the end of said branch, which drop pipe flange is embraced by a clamping ring 5 through the medium of the countersunk lip 6 on the ring, so that while the drop pipe and main pipe branch can be drawn into liquid-tight abutment through interposed gasket 8 by means of bolts 7 passing through the flange 3 and the clamping ring 5, the drop pipe can, nevertheless, after assembly of all the parts described but before tightening up the bolts, be rotated in its coupling to any desired degree and thus enable the deflections and other parts of the drop pipe to be positioned on the job precisely as desired notwithstanding the development of all the parts in their final shapes prior to shipping them to the place of use.

I claim:—

In a boiler washing system for locomotive terminal houses, a locomotive stall post, a series of main pipes supported in an upper level adjacent to and extending past said post, said pipes having, at points therein adjacent to said post, vertically presented transversely flanged branches, flanged drop pipes supported from the respective main pipes, having upper ends coaxial with and opposed to the ends of said branches, clamping rings opposed to the flanges of the branches embracing the flanges on the drop pipes and assembling the drop pipes with the branches with freedom of the drop pipes to rotate, said drop pipes having bends which offset them respectively from the main pipes by which they are supported laterally to the stall post, and said drop pipes extending beyond their bends downwardly along said post to their points of service; said clamping rings and branch-flanges adapted to tighten the connected ends of the drop pipes after the drop pipes have assumed the positions described.

Signed at Chicago, Illinois, this 30th day of Apr., 1923.

SPENCER OTIS.